(12) United States Patent
Goren (10) Patent No.: US 6,980,200 B2
(45) Date of Patent: Dec. 27, 2005

(54) RAPID ENTRY OF DATA AND INFORMATION ON A REDUCED SIZE INPUT AREA

(76) Inventor: Michael Goren, 17 Dublin Dr., Niskayuna, NY (US) 12309

( * ) Notice: Subject to any disclaimer, the term of this patent is extended or adjusted under 35 U.S.C. 154(b) by 0 days.

(21) Appl. No.: 10/403,352

(22) Filed: Mar. 31, 2003

(65) Prior Publication Data

US 2003/0189553 A1     Oct. 9, 2003

Related U.S. Application Data

(62) Division of application No. 09/592,323, filed on Jun. 13, 2000.

(51) Int. Cl.⁷ .............................. G09G 5/00; G06F 3/00
(52) U.S. Cl. ...................... 345/169; 345/168; 345/173; 715/776; 715/825; 715/854; 715/855; 715/864
(58) Field of Search .................. 345/173, 169, 345/168, 158, 156, 841, 776, 840, 854; 715/776, 715/825, 854, 855, 864

(56) References Cited

U.S. PATENT DOCUMENTS

| | | | |
|---|---|---|---|
| 4,737,980 A | 4/1988 | Curtin et al. .................. 379/97 |
| 4,804,279 A | 2/1989 | Berkelmans et al. .......... 400/94 |
| 4,913,573 A | 4/1990 | Retter ........................ 400/489 |
| 5,003,301 A | 3/1991 | Romberg .................... 340/711 |
| 5,109,352 A | 4/1992 | O'Dell ....................... 395/150 |
| 5,124,702 A | 6/1992 | van Ardenne ................ 341/22 |
| 5,148,155 A | 9/1992 | Martin et al. ................ 340/712 |
| 5,210,689 A | 5/1993 | Baker et al. ................. 364/419 |
| 5,252,951 A * | 10/1993 | Tannenbaum et al. ....... 345/156 |
| 5,260,697 A | 11/1993 | Barrett et al. ................ 345/173 |
| 5,521,986 A | 5/1996 | Curtin, II et al. ........... 382/187 |
| 5,604,861 A * | 2/1997 | Douglas et al. ............. 345/776 |
| 5,613,137 A | 3/1997 | Bertram et al. ............. 395/800 |
| 5,627,980 A * | 5/1997 | Schilit et al. ................ 345/841 |
| 5,657,378 A | 8/1997 | Haddock et al. ......... 379/93.23 |
| 5,664,896 A | 9/1997 | Blumberg .................... 400/485 |
| 5,681,220 A | 10/1997 | Bertram et al. ............... 463/37 |
| 5,689,253 A | 11/1997 | Hargreaves et al. .......... 341/22 |
| 5,786,776 A | 7/1998 | Kisaichi et al. ............... 341/23 |
| 5,790,115 A | 8/1998 | Pleyer et al. ................ 345/327 |
| 5,797,098 A | 8/1998 | Schroeder et al. .......... 455/464 |
| 5,799,267 A | 8/1998 | Siegal ............................ 704/1 |
| 5,870,492 A | 2/1999 | Shimizu et al. ............. 382/187 |

(Continued)

FOREIGN PATENT DOCUMENTS

AU           693553         11/1998

(Continued)

OTHER PUBLICATIONS

Miika Silfverberg, I. Scott MacKenzie, and Panu Korhonen, Predicting Text Entry Speed on Mobile Phones, Apr., 2000, 30 pages.

(Continued)

Primary Examiner—Bipin Shalwala
Assistant Examiner—David L. Lewis
(74) Attorney, Agent, or Firm—Fliesler Meyer LLP (57) ABSTRACT

A method and device designed to improve the speed, accuracy, and ease of entry of characters and other symbols by a user. The device is designed to use a reduced size input area as an input source and optionally as a display screen. A set of characters or other symbols is divided into subsets, each subset being represented by a control button for display on the reduced size input area for user selection. A user's selection of a control button produces a secondary set of buttons representing the characters or other symbols in the selected subset for user selection, storage, and display.

16 Claims, 7 Drawing Sheets

U.S. PATENT DOCUMENTS

| | | | | |
|---|---|---|---|---|
| 5,875,311 | A | | 2/1999 | Bertram et al. ............. 395/309 |
| 5,889,506 | A | * | 3/1999 | Lopresti et al. ............. 345/158 |
| 5,896,126 | A | * | 4/1999 | Shieh ......................... 345/173 |
| 5,900,864 | A | | 5/1999 | Macdonald ................ 345/172 |
| 5,924,803 | A | | 7/1999 | Curtin, IV et al. ......... 400/100 |
| 5,943,044 | A | | 8/1999 | Martinelli et al. .......... 345/174 |
| 5,945,928 | A | | 8/1999 | Kushler et al. ............... 341/28 |
| 5,956,021 | A | | 9/1999 | Kubota et al. ............. 345/179 |
| 5,974,238 | A | | 10/1999 | Chase, Jr. ............. 395/200.78 |
| 5,982,303 | A | | 11/1999 | Smith .......................... 341/22 |
| 5,990,890 | A | | 11/1999 | Etheredge ................... 345/347 |
| 6,002,390 | A | * | 12/1999 | Masui ........................ 345/173 |
| 6,005,496 | A | | 12/1999 | Hargreaves et al. .......... 341/22 |
| 6,008,799 | A | | 12/1999 | Van Kleeck ................ 345/173 |
| 6,011,554 | A | | 1/2000 | King et al. ................. 345/352 |
| 6,016,142 | A | | 1/2000 | Chang et al. ............... 345/334 |
| 6,094,197 | A | | 7/2000 | Buxton et al. .............. 345/358 |
| 6,098,086 | A | | 8/2000 | Krueger ...................... 707/535 |
| 6,121,960 | A | * | 9/2000 | Carroll et al. .............. 345/173 |
| 6,169,538 | B1 | * | 1/2001 | Nowlan et al. ............. 345/168 |
| 6,271,835 | B1 | * | 8/2001 | Hoeksma .................... 345/168 |
| 6,295,052 | B1 | | 9/2001 | Kato ........................... 345/179 |
| 6,307,541 | B1 | | 10/2001 | Ho et al. ..................... 345/171 |
| 6,320,570 | B2 | | 11/2001 | Robb ......................... 345/179 |
| 6,323,846 | B1 | * | 11/2001 | Westerman et al. ......... 345/173 |
| 6,363,109 | B1 | | 3/2002 | Polley et al. |
| 6,377,966 | B1 | | 4/2002 | Cooper et al. .............. 707/542 |
| 6,389,386 | B1 | | 5/2002 | Hetherington ................. 704/8 |

FOREIGN PATENT DOCUMENTS

NZ          285346          6/1999

OTHER PUBLICATIONS

Pages from www.thumscript.com downloaded Jan. 4, 2002. (Publication date unknown.).

US 6,346,955, 02/2002, Moon (withdrawn)

* cited by examiner

RAPID ENTRY OF DATA AND INFORMATION ON A REDUCED SIZE INPUT AREA

CLAIM OF PRIORITY

This application is a divisional of application Ser. No. 09/592,323, filed Jun. 13, 2000, and is incorporated herein by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF USE

The present invention relates to electronic input devices, and particularly to providing a space saving method and system for rapid entry of data and information.

BACKGROUND

Currently, a large portion of computing devices are increasingly becoming compact and in many instances portable. These computing devices include personal digital assistants (PDAs), mobile phones, web appliances, and other information devices. There has also been an increased desire to have these devices interconnected not only with each other but also with the Internet.

But smaller computing devices require smaller input devices. Touch-screens, touch-pads, and smaller keyboards are commonly being used for entering or inputting data or other information into these smaller devices. However, the current use of these smaller input devices has several drawbacks.

First, displaying a touch-sensitive keyboard on these smaller screens or using a smaller keyboard has resulted in keys too small for ergonomic comfort. In addition, the error rate associated with these smaller keyboards is increased compared to larger keyboards, while the overall input speed is decreased due to the accidental touch by the user of more than one key at a time.

Second, while the stylus, or pen based method has its advantages over the smaller keyboards, it currently requires handwritten symbols. These handwritten symbols are usually designed specially for use with a particular device and typically require the user to learn a new language of characters while also requiring the computer to translate the input handwritten characters into a known associated character. This type of input also increases the error rate and decreases the input speed due to either the user not knowing the new language and having to either stop and look at a conversion card or guess, or the computing device mismatching the input character with the wrong symbol. Moreover, if the user has poor handwriting, the error rate will further increase. The stylus is also often lost or misplaced, making input that much more difficult. To avoid some of the problems associated with a stylus, some users carry a larger keyboard to plug into their computing devices; nonetheless, these keyboards have additional weight and space requirements, sometimes defeating the portability purposes of having the small computing device.

Third, using a reduced keyboard disambiguating computer, which has a reduced set of keys, where each key represents numerous characters and/or numbers, is also inefficient for practical use. A disambiguating computer processes an entered keystroke sequence by matching the different combinations of letters associated with each keystroke to a stored list of words. The words matching the combinations of letters are then displayed for user selection. This method requires a user to enter a combination of keystrokes and then choose from a list of words. The list the user must select from is often quite long requiring the user to read through each potential choice to find the desired word. Additionally, by limiting the user to the set of choices provided by the computer, the user is limited in word choice as the user may not enter words that are not in the computer's stored vocabulary. This type of input, while reducing the error rate associated with the stylus, is much slower and often frustrating to the user due to the need to press a sequence of keys and then filter through a list of computer generated choices. Moreover, disambiguating computers, as well as stylus-based devices, may be less useful with different languages or when more than one language is used.

Fourth, the communication capabilities of these portable devices are important. While some are completely stand alone devices, limiting the information available to the user, other devices have the capability to communicate with each other and link up to personal computers to store and receive information. Still, the user is often limited to a small category of programs and devices that the user may effectively communicate with through the device.

Accordingly, with the current trend of portable computing devices and increased communications, it is desirable to create a device which solves the above disadvantages by improving the speed, accuracy and ease of inputting information yet still fulfills the goal of portability and interconnectivity.

SUMMARY OF THE INVENTION

An embodiment of the present invention is directed to a system and method for receiving and displaying information in response to a user's input. Initially, a set of control buttons are displayed on an input source. Each control button has associated with it a subset of characters or symbols that are selected from a larger set of characters or symbols. Input is received from a user who selects a control button and in response to the user's selection, a set of secondary buttons is displayed. These secondary buttons represent the characters or symbols associated with the user-selected control button. Upon user selection of a secondary button, the device stores the selected character or symbol and displays the selected character or symbol on a viewing area.

In another embodiment, there may be two input sources. The first input source is a keypad that is used to represent the control buttons. Upon selection by a user of one of the control buttons, the associated set of secondary buttons are then displayed on a second input source. The user may select the desired secondary key from the second input source. The character or symbol represented by the user-selected secondary key is then stored on a storage medium and displayed on a viewing area.

In some embodiments, the input source may be a touch-sensitive display or other on-screen keyboard. Further, some embodiments may be capable of communicating with other computing devices, software programs, and the Internet.

Additionally, some embodiments may have a speaker and/or microphone for voice-activated input, recording, and playing audio information.

DETAILED DESCRIPTION

Generally described, the system and method in accordance with an embodiment of the present invention is designed to improve the speed, accuracy, and ease of inputting information into a computing device while limiting the overall size of the device. A computing device in accordance with the invention can be any type of computing device that includes a processor, including desktop computers, but will often also be small and portable, including personal digital assistants (PDAs), mobile phones, web appliances, digital remote controls, and other information devices.

A device in accordance with one embodiment of the invention has a viewing area that can be used for both input and display of information or alternatively just for input. The viewing area is used for displaying a short list of characters or other symbols in an arranged order. Each character or symbol in the short list is each in turn associated with a subset of characters or symbols from which the user may easily make an input selection. A user-selected character or other symbol is then displayed either on a separate portion of the same viewing area, on a separate display screen, or on both. Examples of embodiments of the present invention are described more fully below.

Figure 1:
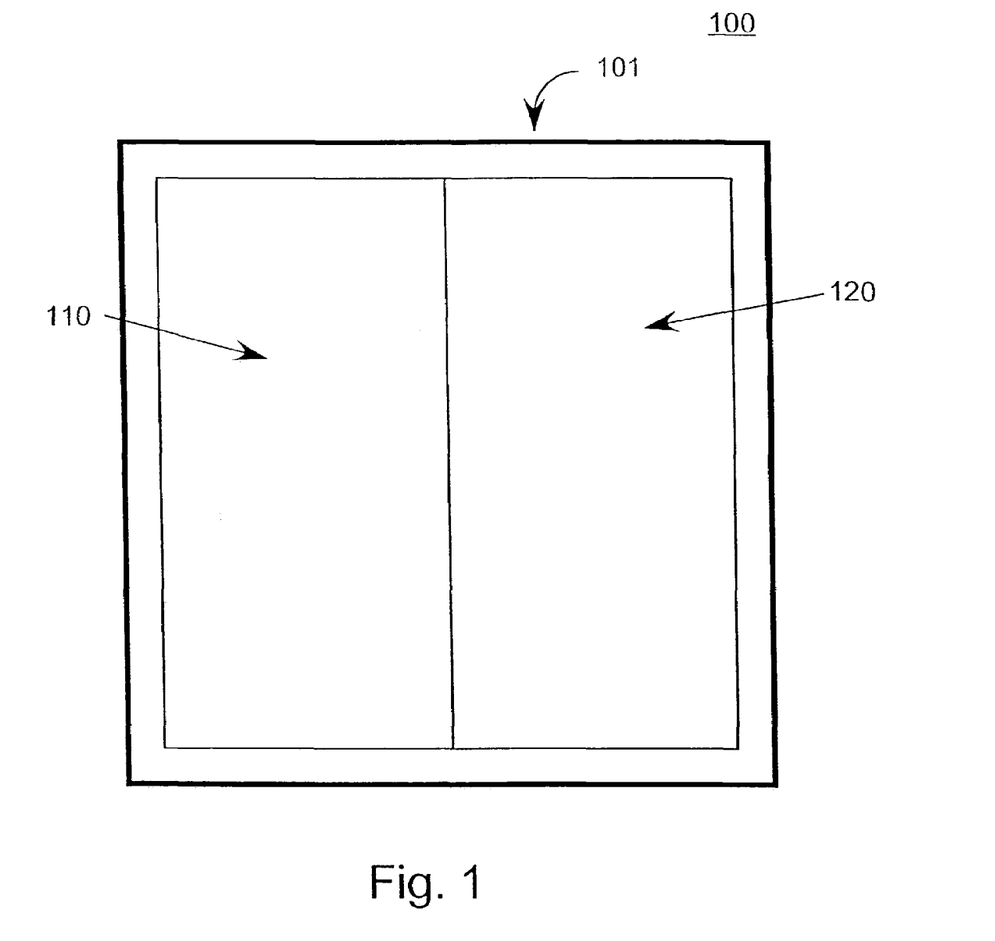
FIG. 1 is a representational block diagram of an embodiment of the viewing area of a device in accordance with the present invention.

FIG. 1 is a block diagram of one embodiment of the viewing area 100 of the present invention that uses a touch-sensitive screen 101 for both the input section 110 and the display section 120. The arrangement of the input section 110 and display section 120 of the viewing area 100 can be presented tiled side-by-side, as shown in FIG. 1, tiled top-to-bottom, or in any other arrangement. The input section 110 of the viewing area 100 displays characters or other symbols for selection by a user. The display section 120 of the viewing area 100 subsequently displays the characters or other symbols that the user has selected. In other embodiments, rather than being part of the same viewing area 100, the display section 120 can be viewed on a physically separate display (not shown), thereby allowing the user full use of the viewing area 100 as the input section 110. Such a physically separate display can be incorporated in the same device as input section 110, or it can be incorporated into another device that communicates with the device incorporating input section 110.

A processor (not shown) is in communication with the viewing area 100 for sending and receiving signals. When a user enters information in the input section 110, the processor receives a signal from the input section 110 of the viewing area 100 and either displays additional information (such as a set of characters or other symbols) on the input section 110 or stores the information input by the user on a storage medium (not shown) and sends a signal to the display section 120 to display the information input by the user. The display section 120 of the viewing area 100, in response to the processor signal, displays the information.

Figure 2:
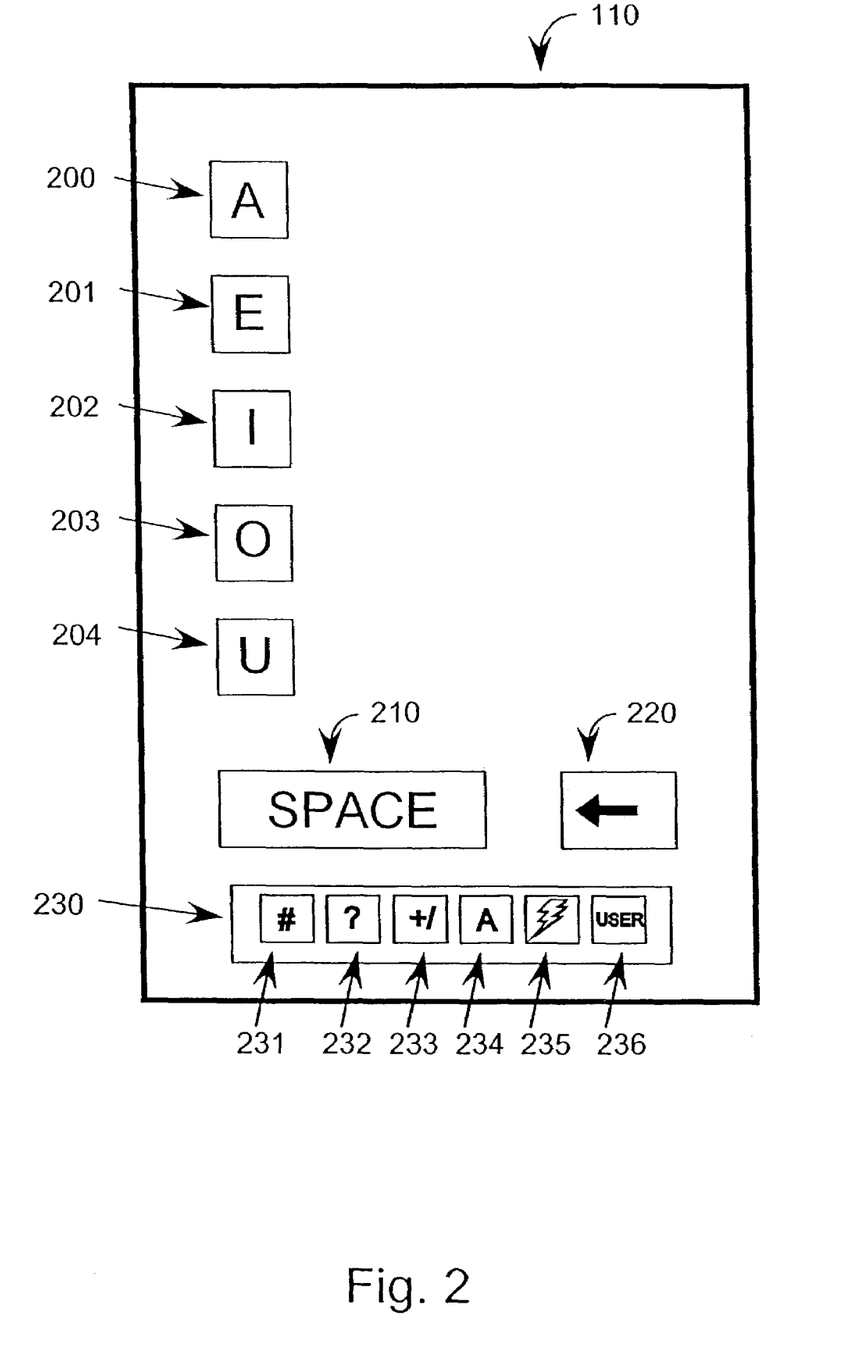
FIG. 2 is a representational diagram of an embodiment of the input section of the viewing area of a device in accordance with the present invention.

FIG. 2 shows an embodiment of the input section 110 of the viewing area 100. A short set of graphic images or characters is initially displayed on the input section 110 including, among other images, control buttons 200–204, a space bar button 210, a backspace button 220, and a menu bar 230.

The control buttons can be any selection of letters, numbers, characters, mathematical symbols, punctuation, or other objects. The control buttons 200–204, for example, are the buttons for the vowels of the English alphabet. Each control button 200–204 has a set of secondary buttons associated with it. In an embodiment, the control button 200 has associated with it secondary buttons for representing the letters A, B, C, and D. Control button 201 has secondary buttons E, F, G, and H associated with it. Control button 202 has secondary buttons I, J, K, L, M, and N associated with it. Control button 203 has secondary buttons O, P, Q, R, S, and T associated with it, and control button 204 has secondary buttons U, V, W, X, Y, and Z associated with it. As described, in some embodiments, the sets of secondary buttons include a button for the character represented as the selected control button, namely A, E, I, O, or U, depending which is selected by the user.

Upon selection by a user of one of the desired control buttons 200–204, the processor receives a signal, and in response removes the non-selected control buttons and displays the associated list of secondary buttons. For instance, referring to FIG. 3, if the user selects control button 202, the remaining control buttons 200, 201, 203, and 204 are removed from display in the input section 110, and the secondary buttons 300–305 associated with the selected control button 202 are then displayed in the input section 110.

Figure 3:
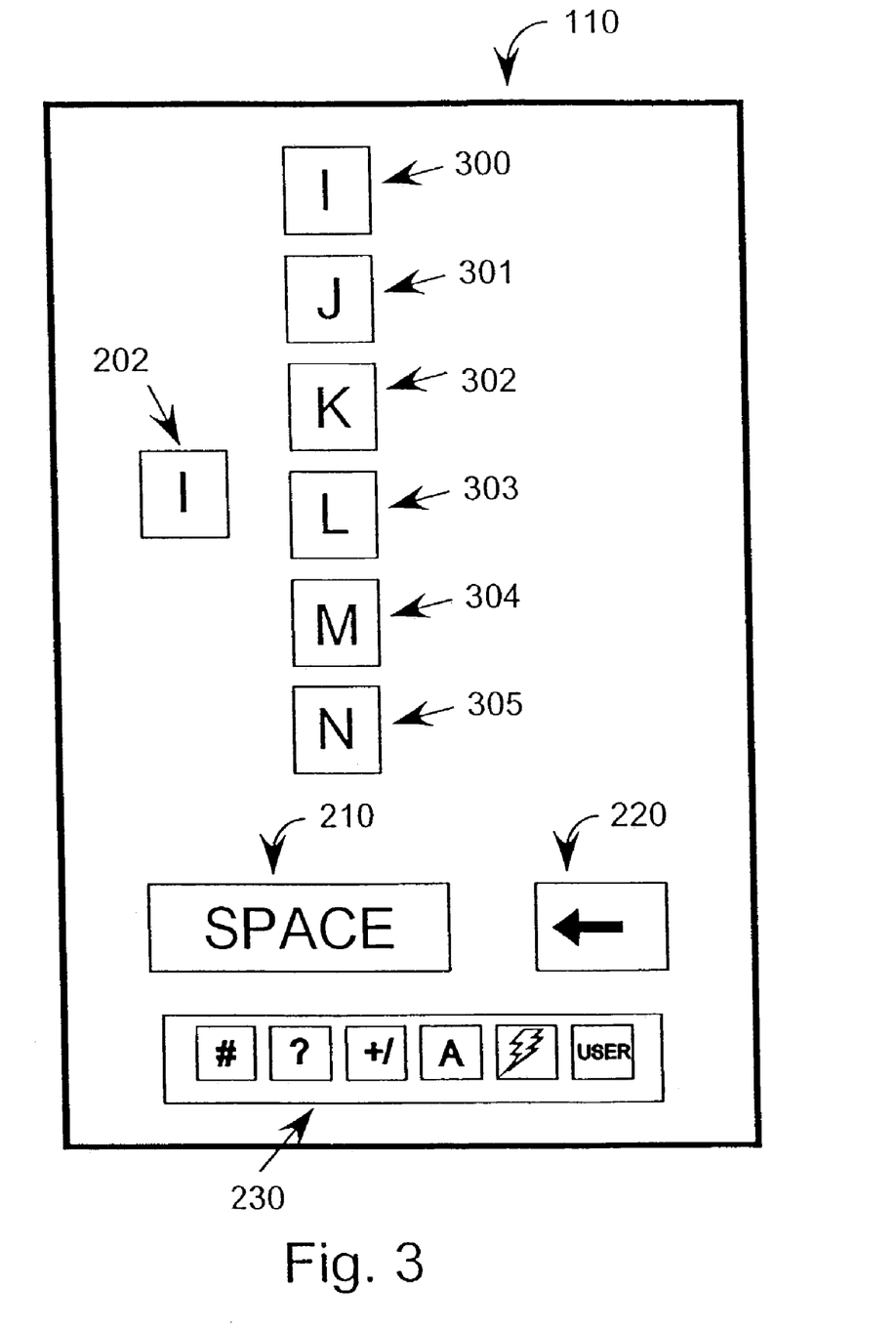
FIG. 3 is a representational diagram of an embodiment of the input section of the viewing area of a device displaying secondary buttons in accordance with the present invention.

In one embodiment, the secondary buttons 300–305 may be oriented in a vertical fashion to the right of the control button 202, but close enough to the control button 202 to ergonomically enhance speed and ease of entry. In some embodiments, this spacing may be adjusted by the user. Alternatively, the secondary buttons 300–305 may be displayed in a variety of user-selected arrangements, including among other arrangements, horizontal, circular, semi-circular, and diagonal. Further, in some embodiments, the secondary buttons 300–305 may be displayed on a physically separate touch-sensitive display screen (not shown).

In other embodiments, the control buttons 200–204 may remain on the input section 110 while the secondary buttons 300–305 are displayed in one of the above-described arrangements next to the control buttons 200–204. In such embodiments, the non-selected control buttons 200, 201, 203, and 204 may be displayed with reduced shading or differing color to show that they have not been selected.

In another embodiment, the non-selected control buttons 200, 201, 203, and 204 may remain active, thereby allowing the user to change the set of secondary buttons 300–305 currently being displayed by selecting one of the previously non-selected control buttons 200, 201, 203, or 204.

Once the user selects a control button and the secondary buttons are displayed, the user may then select one of the secondary buttons 300–305. Upon user selection, a signal is sent to the processor, which in turn stores the user-selected character or other symbol on the storage medium and sends a signal to the display section 120 to display the selected character or other symbol.

In some embodiments, if the user does not select a secondary button 300–305 within a predetermined time, the secondary buttons 300–305 are removed from the input section 110, and the original set of control buttons 200–204 are returned to the input section 110.

In addition, the user may desire to have the character that is being input capitalized. In some embodiments, the user may capitalize a character by simultaneously touching the selected control button 200–204, in this example 202, and the desired secondary button 300–305. For example, if the user desires to input a "L", the user would simultaneously touch the area on the input section 110, representing the control button 202, and the area representing the secondary button 303. The processor will receive a signal from the input section 110 and in return store a "L" on a storage medium and send a signal to the display section 120 to display a "L".

Alternatively, in another embodiment, the user may quickly tap the input section 110 representing the desired secondary button 300–305 two times in succession, thereby alerting the processor to store and display a capital letter. Further, if the user wishes to capitalize all characters that will subsequently be input, he may quickly tap the area representing a control button 200–204 twice, thereby setting what is known as a "caps lock". The user may remove the caps lock by repeating the process of quickly tapping the area representing a control button 200–204 twice.

In some embodiments, a button representing a "shift" is displayed on the input section 110. In such embodiments, a user could capitalize a character by touching the "shift" button and the desired secondary button 300–305.

Once the user has selected a secondary button 300–305 to be input, the processor then removes the secondary buttons 300–305 and returns the original set of control buttons 200–204 to the input section 110. There is a slight delay between the time the desired secondary button 300–305 is selected and the removal of the buttons. This delay gives the user enough time to capitalize the desired character by the process described above but is short enough in duration to enhance the speed of overall operation and input.

The menu bar 230 displays available control buttons, functions, and options that are currently available to a user. In one embodiment, the menu bar 230 may display the buttons 231–236, which represent different sets of control buttons, for example, one for numbers 231, one for punctuation 232, one for mathematical functions 233, one for characters 234, one for battery supply 235, and one for user features 236. Other embodiments could include sets of control buttons other than those listed here. If the user desires to change the set of control buttons, or their arrangement, from those displayed on the input section 110, the user selects the desired control button 231–236 from the menu bar 230. The processor receives a signal from the menu bar in response to the user's input and subsequently removes the current set of control buttons, e.g., 200–204, from the input section 110 and displays a new set of control buttons on the input section 110. Thus, it should be clear that control buttons and secondary buttons can be designed to accommodate virtually any language or any symbol that might be desirable to input and display.

In addition, a user may select the user button 236 from the menu bar 230 allowing selection of optional features. In some embodiments, the user may select, among other things, how the buttons are being displayed on the input section 110, the size of the buttons, and the brightness/tint of the viewing area. For example, the control buttons can be arranged for either right- or left-handed users and in any desired shape and order. In some embodiments, a user could select to have the control buttons displayed vertically, as shown in FIG. 2, horizontally, circularly, semi-circularly, diagonally, or in any other arrangement.

The space bar button 210 is included in some embodiments to allow the user to easily input a space character. The space bar button 210 is located in an area that is easily accessible by the user to increase speed of input and ergonomic comfort. For example, the space bar button 210 may be located in a position easily accessible to the user by use of their thumb. Once the area of the input section 110 that is displaying the space bar button 210 is touched by the user, a signal is sent to the processor which in return stores a space character on a storage medium (not shown) and sends a signal to the display section 120 to display a space in the information that is currently being displayed. The display section 120, in response to the signal displays a space in the information currently being displayed. Alternatively, in some embodiments, the space bar button 210 may be included in the punctuation button set, which is represented by button 233.

The backspace button 220 allows the user to easily remove previously entered information. When the area of the input section 110 that is displaying the backspace button 220 is touched by a user, a signal is sent to the processor which in response to the signal removes the previously selected character or other symbol from memory and sends a signal to the display section 120 to remove the previously selected character or other symbol from the display. The display section 120 in response to the signal removes the character or other symbol from the display section 120 of the viewing area 100.

In another embodiment, the input section 110 of the viewing area 100 initially may not be displaying any buttons. The user may select a desired set of secondary buttons by touching the input section 110 with either one, two, three, four, or five simultaneous touches. In some embodiments, these touches may be performed by the user pressing one, two, three, four, or five fingers on the input section 110.

For example, an embodiment using English character input may have secondary buttons A, B, C, and D associated with the touch of one finger; secondary buttons E, F, G, and H associated with the touch of two fingers; I, J, K, L, M, and N associated with the touch of three fingers; O, P, Q, R, S, and T associated with the touch of four fingers; and U, V, W, X, Y, and Z associated with the touch of all five fingers. Upon receiving one to five simultaneous touches, the processor receives a signal and in response causes the corresponding secondary set of characters to be displayed on the input section 110. The user then may perform the remaining procedure of selecting an item as described above. After the user has selected a secondary button to be input or no selection has occurred in a predetermined amount of time, the input section 110 returns to blank and awaits a new set of touches from a user.

Figure 4:
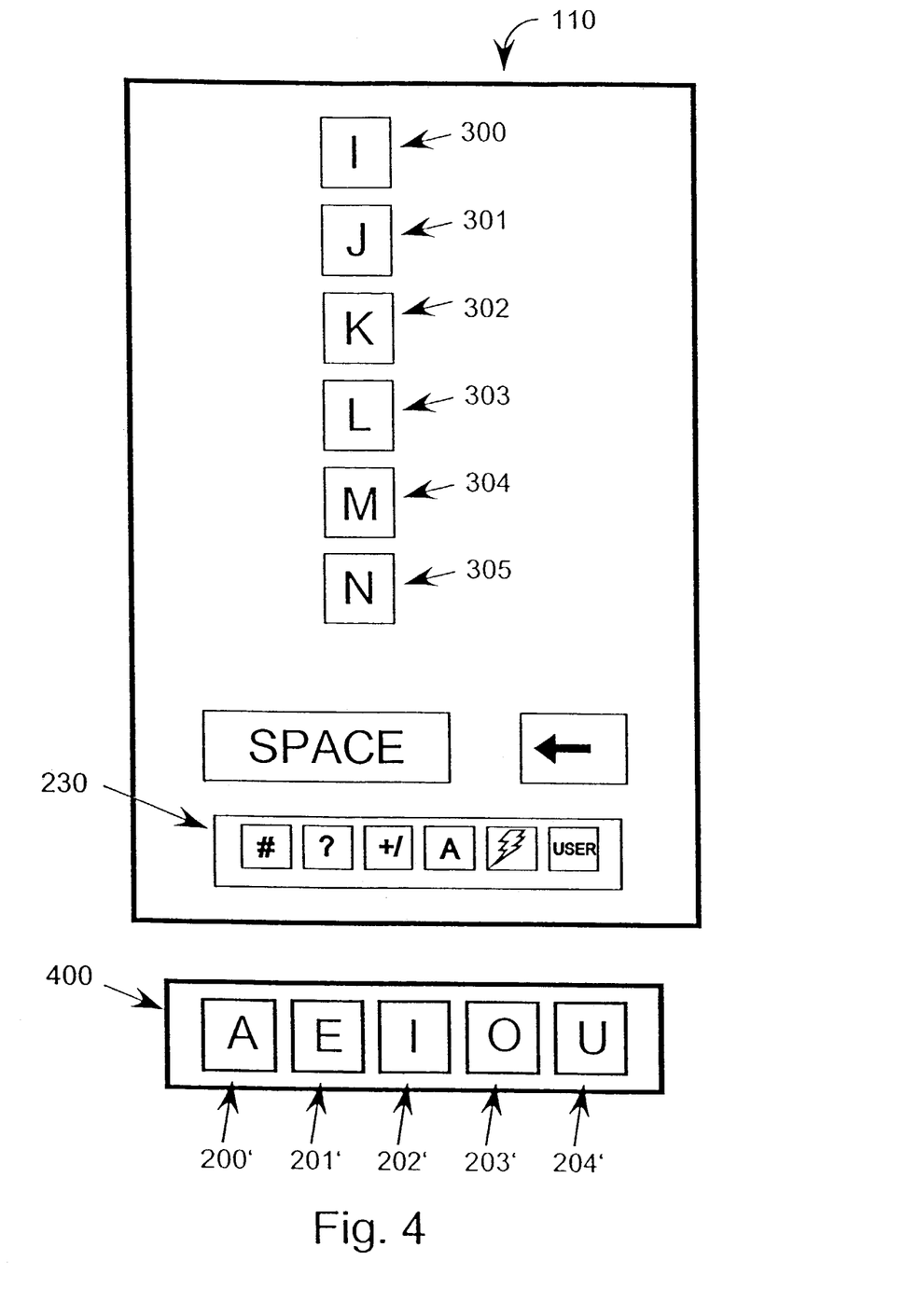
FIG. 4 is a representational diagram of an embodiment of the input section of the viewing area and associated keypad of a device in accordance with the present invention.

FIG. 4 represents an alternative embodiment of the invention. In the embodiment of FIG. 4, there is a keypad 400, functioning as part of the input section 110, in communication with the processor. The keypad 400 contains control buttons 200'–204'. Initially, the input section 110 of the viewing area 100 does not display any buttons. In some embodiments, the input section 110 of the viewing area 100 initially displays the menu bar 230.

The user performs the step of selecting a control button 200'–204' by pressing one of the buttons on the keypad 400. This selection sends a signal from the keypad 400 to the processor, which in return sends a signal to the input section 110 of the viewing area 100 to display the associated list of secondary buttons 300–305. The remaining procedure of the user selecting an item may be performed as described above. It is to be understood that although a 5-key keypad is illustrated, any number of keys could be used, including a standard typewriter-style (QWERTY) keyboard.

Figure 5:
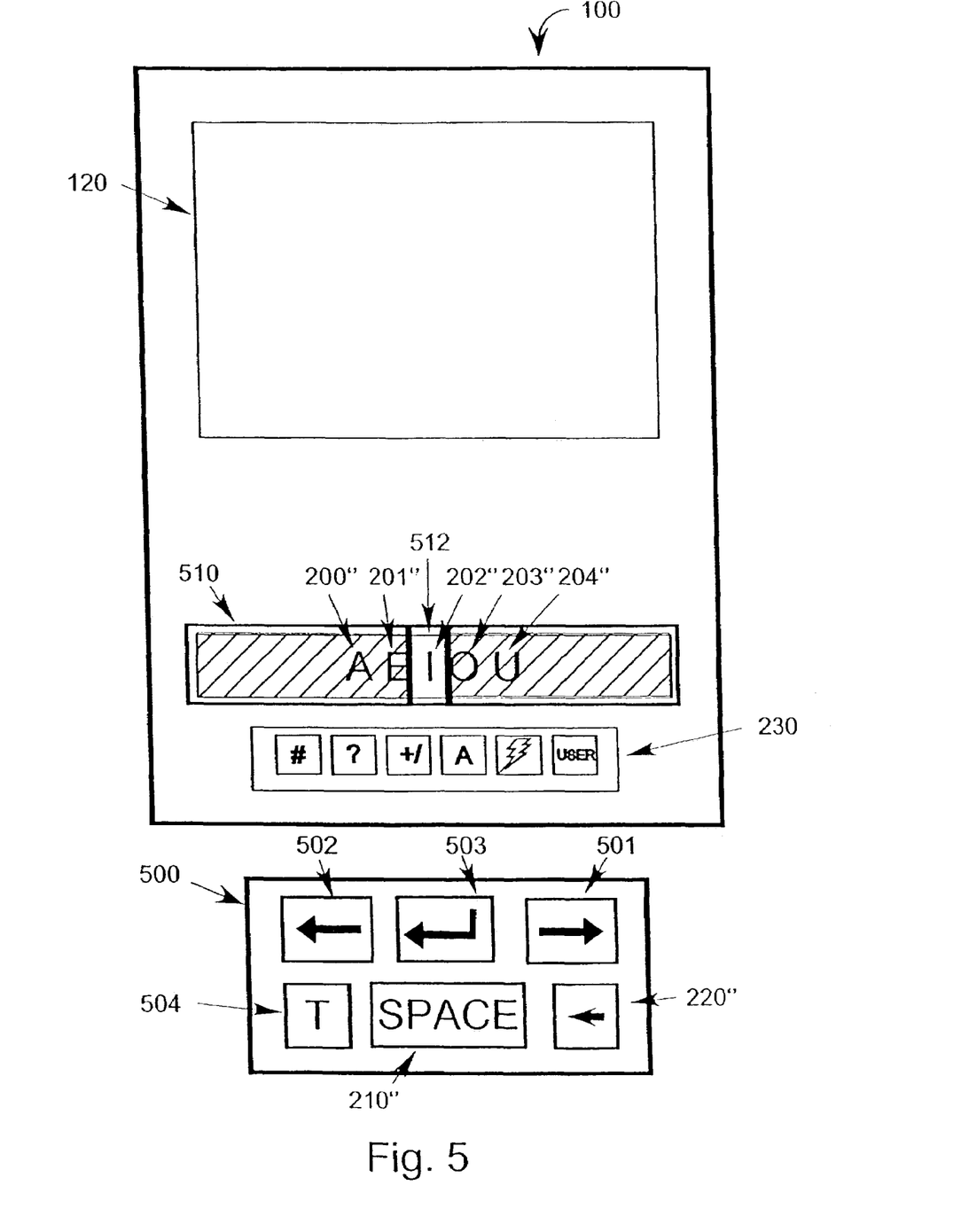
FIG. 5 is a representational diagram of another embodiment of the input section of the viewing area and associated keypad of a device in accordance with the present invention.

In yet another embodiment, as illustrated in FIG. 5, there is a keypad 500 functioning as part of the input section 110, which includes a forward arrow button 501, a back arrow button 502, a select button 503, a tab button 504, a space bar button 210", and a backspace button 220". In this embodiment, the keypad 500 is in communication with a processor. Additionally, the viewing area 100 need not be a touch-sensitive screen.

The viewing area 100 includes, among other things, a display section 120, a menu bar 230, and a scroll bar 510 (functioning as part of the input section), which has a set of control buttons represented within it and a selection window 512. As discussed above, the control buttons may represent, for example, the vowels of the English alphabet, mathematical symbols, numbers, or punctuation. In some embodiments, the scroll bar may be arranged horizontally, as seen in FIG. 5, vertically, or in any other arrangement. Further, the display section 120 can be represented on a physically separate display screen (not shown), thereby reducing the overall dimensions needed for the viewing area 100.

A user, for example, may select the control button 200"–204" that is currently located in the selection window 512 by pressing the select button 503, located on the keypad 500. The user may alter the control button 200"–204" that is currently in the select window 512 by pressing either the forward arrow button 501 or the back arrow button 502. Pressing the forward arrow button 501 or the back arrow button 502 sends a signal to the processor which in response to the signal moves the set of control buttons 200"–204" to the left or right respectively, thereby altering the control button 200"–204" that is being displayed in the selection window 512. In alternate embodiments, pressing the forward arrow button 501 or the back arrow button 502 may result in repositioning the selection window 512 to a new location within the scroll bar 510, thereby altering the control button 200"–204" that is available for selection.

Upon selection of a control button 200"–204" by a user, the processor receives a signal and in return removes the control buttons 200"–204" from the scroll bar 510 and replaces them with the list of secondary buttons associated with the selected control button 200"–204".

Figure 6:
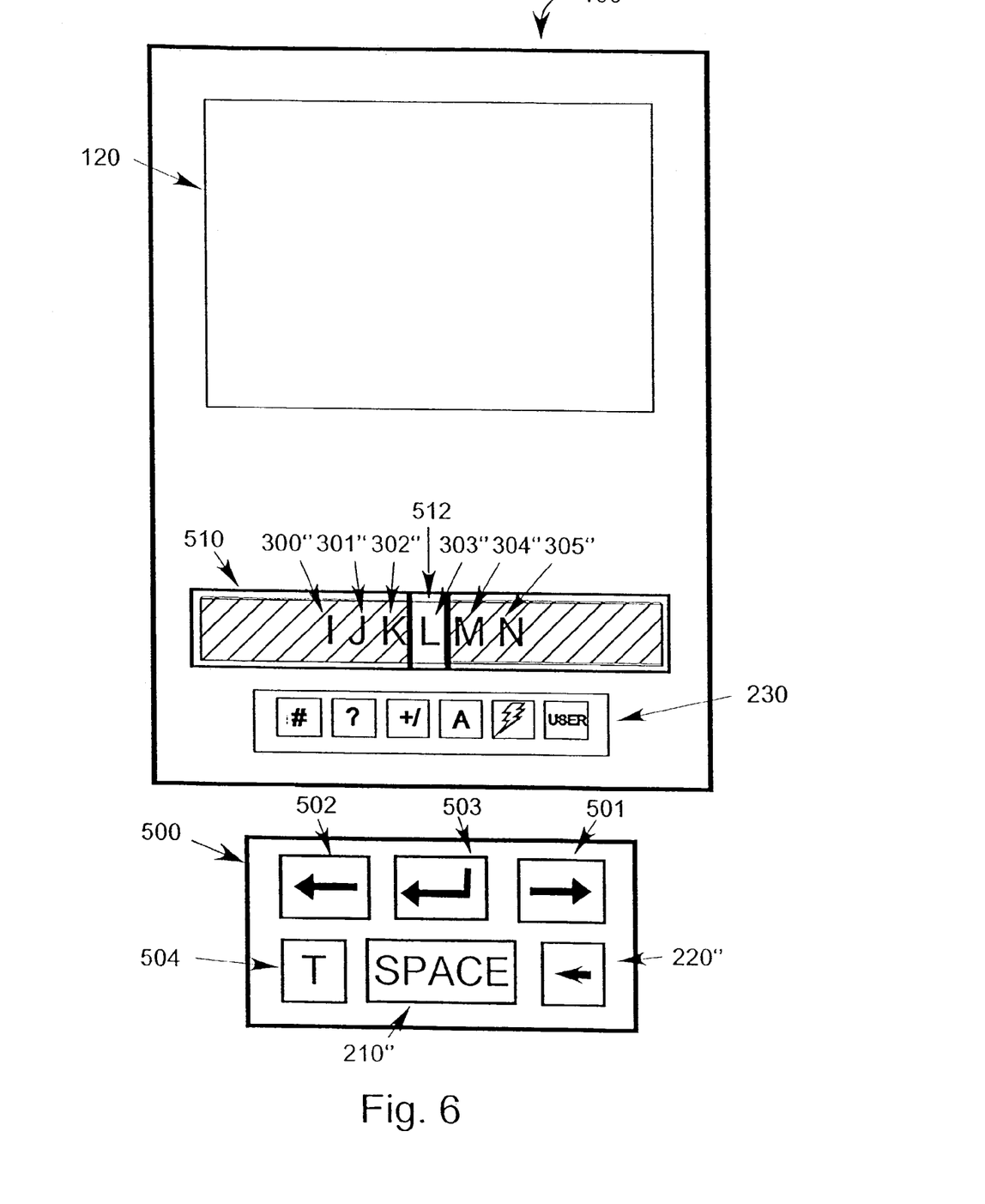
FIG. 6 is a representational diagram of the embodiment of FIG. 5 displaying secondary buttons in accordance with the present invention.

Referring to FIG. 6, for example, if a user selects control button 202" (FIG. 5), which represents the letter I, the control keys 200"–204" are removed from the display and the secondary buttons 300"–305" are then displayed in the scroll bar 510. The user may then select one of the secondary buttons 300"–305" by locating the desired button in the selection window 512 and pressing the select button 503 located on the keypad 500. This location is done by pressing the appropriate forward or back arrow button 501 or 502 respectively. Upon user selection, a signal is sent to the processor, which in turn stores the user-selected character or other symbol on a storage medium and sends a signal to the display area 120 to display the selected character or other symbol.

The user may input a space character by pressing the space bar button 210" or remove the last character entered by pressing the backspace button 220".

Additionally, the user may change the list of control buttons that are currently being displayed in the scroll bar 510 by pressing the tab button 504, which sends a signal to the processor, which in return activates the menu bar 230. The user may then use the forward and back arrow buttons 501 and 502 to navigate the menu bar 230 and select a desired set of control buttons by pressing the select button 503.

Figure 7:
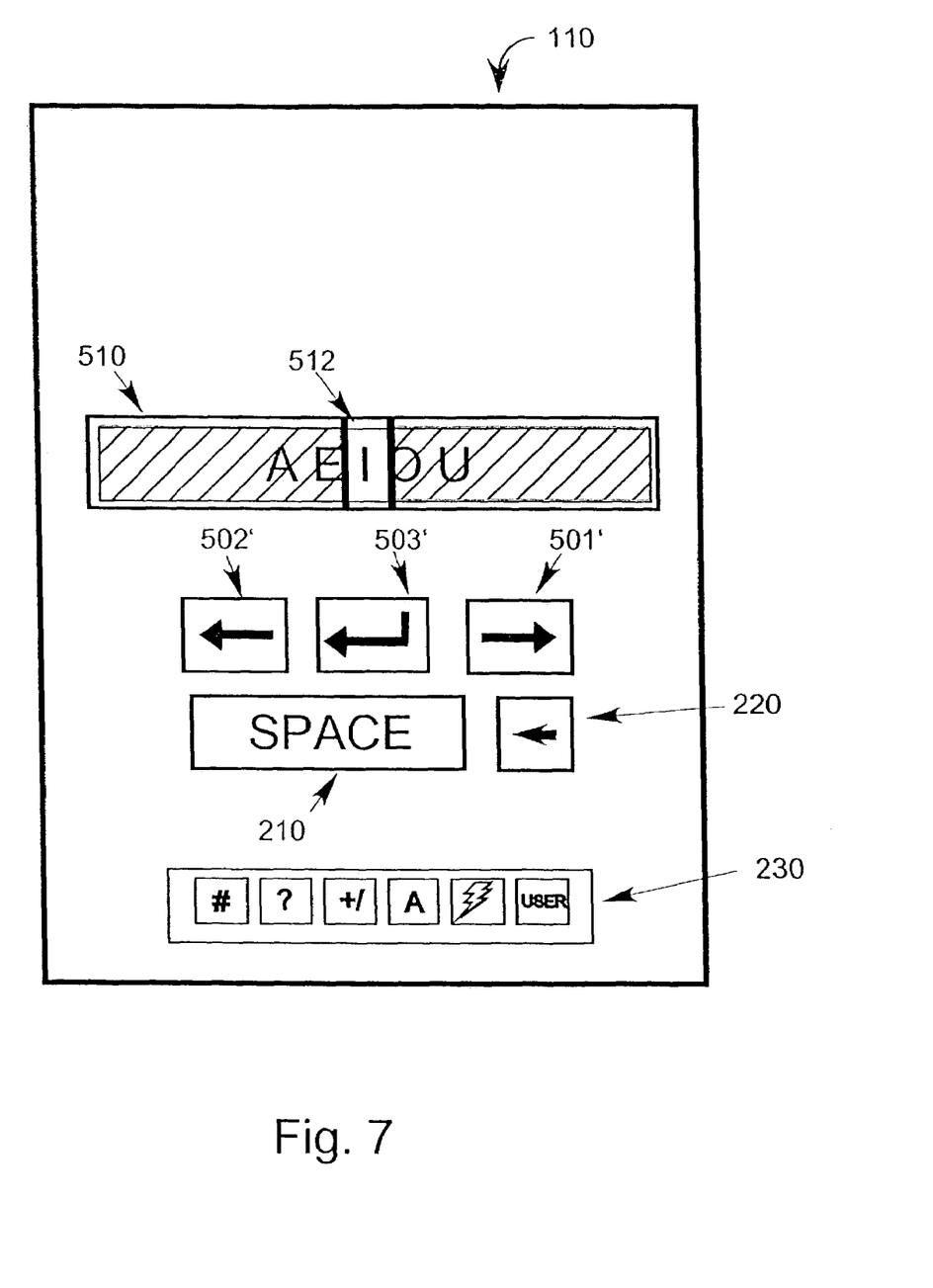
FIG. 7 is a representational diagram of still another embodiment of the input section of the viewing area of a device in accordance with the present invention.

FIG. 7 shows another embodiment of the present invention utilizing a touch-sensitive screen as the input section 110. In this embodiment, the input section 110 of the viewing area 100 displays, among other images, a forward arrow button 501', back arrow button 502', select button 503', space bar button 210, backspace button 220, menu bar 230, and a scroll bar 510, which has a set of control buttons represented within it, and a selection window 512. The user may perform the same functions as discussed above by pressing the area of the input section 110 that represents the forward arrow button 501', back arrow button 502', select button 503', space bar button 210, and backspace button 220.

Alternatively, in the embodiments represented by FIGS. 5 and 7, the scroll bar 510 may display control buttons which represent different sets of characters or other symbols, for example, one for numbers, one for punctuation, one for mathematical functions, and one for characters. A user may select a desired set of characters or other symbols by positioning the associated control button into the selection window 512 and pressing the select button 503. Upon selection of a control button, a signal is sent to a processor which in response to the signal removes the control buttons from the scroll bar 510, and displays the entire list of characters or other symbols associated with the user's selection in the scroll bar 510. For example, if a user selects a control button which represents the letters of the English alphabet, the control buttons are removed from the scroll bar 510, and the English alphabet is then displayed in the scroll bar 510.

A user may then select a desired character or other symbol by pressing the forward or back arrow buttons 501 and 502, thereby altering the character or other symbol being represented in the selection window 512 and pressing the select button 503. Upon user selection, a signal is sent to the processor which in response to the signal stores the selected character or other symbol on a storage medium and sends a signal to the display section 120 to display the selected character or other symbol.

Although a touch-sensitive screen is used frequently herein as exemplary, it is to be understood that any on-screen keyboard could be easily substituted and is contemplated. For instance, in most of the embodiments discussed above, the touch-sensitive display could be replaced with an on-screen keyboard that is activated by a pointing device, such as a stylus, pen, pointer, mouse, touch pad, heat device, light device, laser, wand, or infrared, radio, or sound signals.

In some embodiments of the present invention, the device has the capability of communicating with other computing devices for, among other things, transferring, receiving, synchronizing, and storing information. Such communication may be made using, for example, infrared, radio frequencies, other wireless communication medium, cable or twisted-pair.

Additionally, some embodiments may have a microphone and a speaker which can be used with, or in place of, the buttons, on-screen display, or touch-sensitive display for input of information and to record, store, and play back audio information.

The disclosed embodiments of the present invention are intended to be illustrative and not restrictive, and the scope of the invention is limited only by the claims that follow.

What is claimed is:

1. A device for use in inputting a set of characters, comprising:
    a first set of control input mechanisms each of which has one first character displayed thereon and each of which first character is associated with a respective subset of more than one character, wherein the first characters of said first set of control input mechanisms are from an ordered set of characters, and wherein each said respective subset of characters is from the same ordered set of characters, and wherein the first character is the first character in each respective ordered subset associated with such first character and wherein the character in each respective subset of characters is also from the ordered set of characters;
    multiple subsets of secondary input mechanisms, each of which is comprised of more than one secondary input mechanism, wherein each of said multiple subsets of said secondary input mechanisms is associated with a respective control input mechanism of said first set, wherein each of said secondary input mechanisms represents a single character from the ordered set of characters in said respective subset of characters for data entry of said single character, and wherein a respective set of more than one of said secondary input mechanisms is displayable in response to selection of one of said control input mechanisms;
    a display area for display of a user-selectable character associated with each of said selected control input mechanisms and said secondary input mechanisms, wherein the totality of characters of said first set and said multiple subsets are not displayable on said display area at any one time, and wherein in response to selecting one of said control input mechanisms said subset of characters appears on said display area; and
    an input source for user selection of anyone of said control input mechanisms and anyone of said secondary input mechanisms.

2. The device of claim 1, wherein one of said multiple subsets of secondary input mechanisms becomes available to a user upon activation of one of said characters of said first set of said control input mechanisms.

3. The device of claim 1, wherein said input source is a keyboard and said control input mechanisms are represented on said keyboard.

4. The device of claim 3, wherein said keyboard comprises a touch-sensitive screen.

5. The device of claim 1, wherein said input source is a keypad and said control input mechanisms are represented on said keypad.

6. The device of claim 1, wherein said input source comprises a keypad and a touch-sensitive input screen, wherein said control input mechanisms are represented on said keypad, and wherein said secondary input mechanisms are represented on said touch-sensitive screen upon activation of one of said control input mechanisms.

7. The device of claim 1, further comprising:
    a second input source, wherein said secondary input mechanisms are displayed on said second input source upon activation of one of said control input mechanisms.

8. The device of claim 1, wherein
    said first set of control input mechanisms are control buttons; and
    said multiple subsets of secondary input mechanisms are secondary buttons.

9. The device of claim 1, wherein
    said first set of control input mechanisms are one or more mechanisms responsive to the touch of one, two, three, four, or five fingers.

10. The device of claim 9, wherein:
    the touch of one finger is associated with a first subset of characters;
    the touch of two fingers is associated with a second subset of characters;
    the touch of three fingers is associated with a third subset of characters;
    the touch of four fingers is associated with a fourth subset of characters; and
    the touch of five fingers is associated with a fifth subset of characters.

11. The device of claim 1, wherein
    said first set of control input mechanisms and said multiple subsets of secondary input mechanisms are mechanisms responsive to voice input.

12. A computer readable medium having instructions stored therein which when executed causes the following steps to be performed on a device having an input source with a display:
    displaying a plurality of control buttons on the display of the input source of the device, wherein each control button has one first character displayed thereon initially and each of which is associated with a respective subset of more than one character, wherein the first characters of said plurality of control buttons are from an ordered set of characters;
    receiving a user selection of one of said control buttons from the display of the input source;
    in response to receiving a user selection of one of said control buttons, displaying on the input source a subset of secondary data entry buttons each of which represents a respective character of the subset associated with the one of the selected control buttons, wherein each respective subset of characters comprises an ordered set of characters;
    receiving a user selection of one of said secondary data entry buttons from the input source;
    displaying the character represented by said selected secondary data entry button on the display; and
    wherein the instructions do not allow displaying all of the control buttons and the secondary data entry buttons at any one time.

13. The medium of claim 12, wherein the instructions further cause the step of:
    storing said character represented by said selected secondary data entry button in the device.

14. The medium of claim 12, wherein the instructions further comprise the step of:
    removing the user non-selected control buttons from the input source in response to receiving a user selection of one of said control buttons.

15. The medium of claim 12, wherein the instructions further comprise the steps of:

waiting a predetermined amount of tune for a user to select one of said secondary data entry buttons in response to displaying said subset of secondary data entry buttons;

removing said secondary data entry buttons from said input source in response to a user not selecting one of said secondary data entry buttons within said predetermined amount of time; and restoring said plurality of control buttons to said input source in response to removing said secondary data entry buttons from said input source.

16. The medium of claim 12, wherein the instructions further comprise the steps of:

removing said secondary buttons from said input source, restoring said control buttons to said input source, and awaiting user selection of one of said control buttons, in response to said user selecting from said secondary buttons.

* * * * *